(12) United States Patent
Tardif

(10) Patent No.: US 6,847,290 B2
(45) Date of Patent: Jan. 25, 2005

(54) LOAD TENSION ALERT DEVICE

(76) Inventor: Maurice Tardif, 896 boul. d'Alembert, D'Alembert QBC (CA), J9X 5A3

( * ) Notice: Subject to any disclaimer, the term of this patent is extended or adjusted under 35 U.S.C. 154(b) by 159 days.

(21) Appl. No.: 10/387,399

(22) Filed: Mar. 14, 2003

(65) Prior Publication Data

US 2003/0174055 A1 Sep. 18, 2003

(30) Foreign Application Priority Data

Mar. 14, 2002 (CA) .......................................... 2377296

(51) Int. Cl.$^7$ ................................................. B60Q 1/00
(52) U.S. Cl. ................. 340/440; 340/425.5; 340/426.1; 340/438; 340/686.1
(58) Field of Search .......................... 340/425.5, 426.1, 340/431, 438, 686.1, 687, 445, 440

(56) References Cited

U.S. PATENT DOCUMENTS

| | | |
|---|---|---|
| 3,372,582 A | 3/1968 | Weiss et al. |
| 3,584,835 A * | 6/1971 | White et al. ............. 24/68 CD |
| 3,798,402 A | 3/1974 | Raab |
| 3,870,846 A | 3/1975 | Filip |
| 4,027,130 A | 5/1977 | Filip |
| 4,525,900 A * | 7/1985 | Muller et al. ............. 24/68 CT |
| 4,992,778 A | 2/1991 | McKeen et al. |
| 5,159,729 A * | 11/1992 | Walker ........................ 248/499 |
| 5,885,040 A * | 3/1999 | Parker ......................... 410/50 |
| 5,960,849 A | 10/1999 | Delaney et al. |
| 6,357,978 B1 | 3/2002 | Kämper |

* cited by examiner

*Primary Examiner*—Jeffrey Hofsass
*Assistant Examiner*—Daniel Previl

(57) ABSTRACT

Tension alert device is used with a load secured to a vehicle load bed, which has a securing belt having a connector portion and an attachment link. The device includes a connector sleeve, with an axial bore and a sleeve end portion, which is connected to the link. A first contacter connects to an inner end portion of the sleeve and faces into the axial bore. A second contacter slides in the bore along a restricted path of travel and has a second load bed connector. The second contacter faces the first contacter and is urged away from it when the belt has a first tension threshold value. The first contacter has an electrical signal generator for producing an electrical signal, which is activated when the second contacter is biased against it when the belt attains a second threshold tension value.

14 Claims, 3 Drawing Sheets

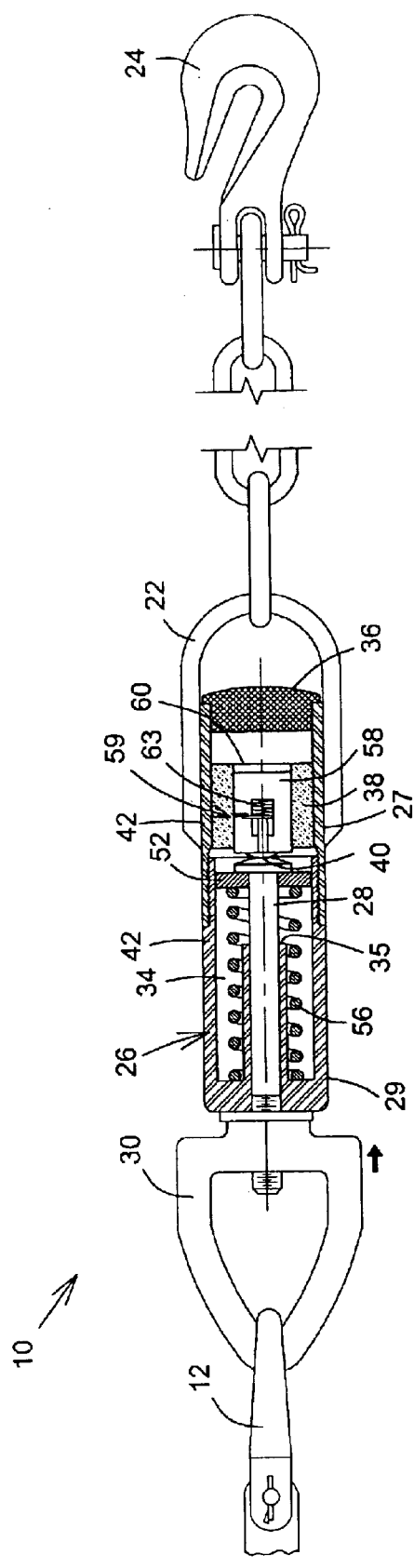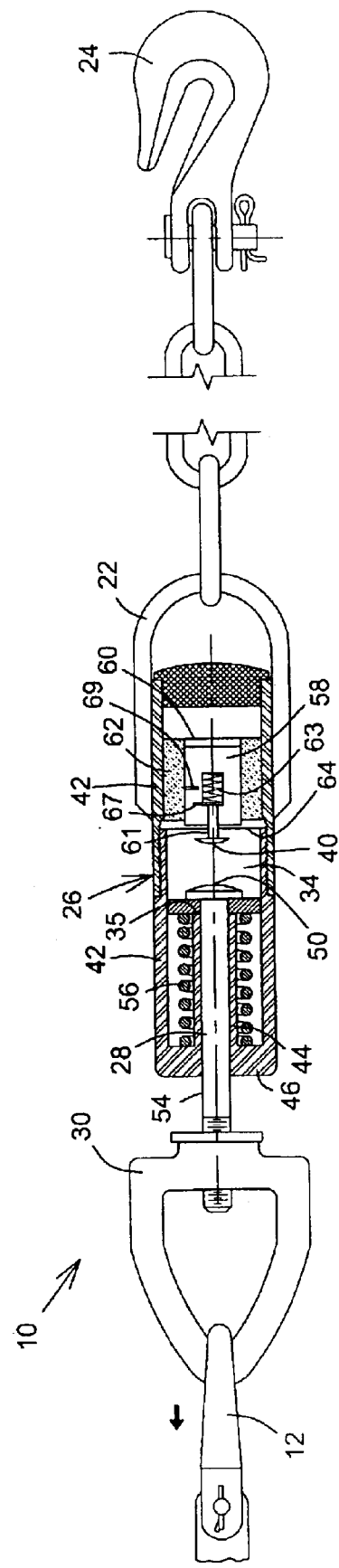

LOAD TENSION ALERT DEVICE

FIELD OF THE INVENTION

The present invention concerns a load tension alert device, more particularly to an alert device for use with a tensioned load on a vehicle load bed.

BACKGROUND OF THE INVENTION

Road accidents involving trucks carrying heavy loads are commonplace. Oftentimes, the accidents are caused by loads shifting on the load bed, which can ultimately cause instability of the truck during turning or when traveling at high speed. The loads are typically secured to the truck's load bed by a number of securing straps. The securing straps are normally lashed over the load and connected to both sides of the load bed using hooks or some other suitable connecting means. While this type of load securing is satisfactory, it has some significant drawbacks. For example, loads have a tendency to shift during transport and the tension in the securing straps can decrease, which results in unstable loads that may dislodge and fall off the load bed causing injury and damage to property. Moreover, the vehicle driver is often unaware of this decrease in strap tension and often has to manually check the integrity of the load, especially on long journeys. This checking increases the delay in delivery of the load and may increase the cost of transporting the load.

Thus there is a need for an alert system that can remotely check the tension in the securing straps and relay an alert signal to the driver if there are any differences in tension.

SUMMARY OF THE INVENTION

The invention reduces the difficulties and disadvantages of the prior art by providing a novel tension alert device that can be incorporated into existing securing systems and which provides an inexpensive method of monitoring tension in a load secured by tensioned straps. Advantageously, the device uses a simple contacter mechanism that includes two contacters, one movable towards the other to generate an electrical circuit, such as when tension in the straps decreases due to a shifting load, and which sends a signal to the driver's cab alerting him to this fact. To achieve this, a novel connector is provided which relays to the cab differences in tensions. In addition, multiple devices can be used to measure the overall tension in the load securing straps and provide to the driver a continual flow of information. Armed with this information, the driver can signal ahead for help or can stop the truck and selectively readjust the tension. Furthermore, the present device allows for wireless communication between the trailer and the cab, thereby eliminating the need of a wire bundle there between that would be cumbersome.

In accordance with a first aspect of the present invention, there is provided a tension alert device for use with a load secured to a vehicle load bed, said device having a first elongate securing member having a first vehicle load bed connector and a first attachment link, said device comprising; a connector sleeve having an axial bore and a sleeve end portion connected to said first attachment link; a first contacter connected to an inner end portion of said connector sleeve and facing into said axial bore; a second contacter mounted to slide in said axial bore along a restricted path of travel and having a second vehicle load bed connector connected to said vehicle load bed, said second contacter facing said first contacter and being urged away therefrom when said first elongate securing member has a first tension threshold value; said second contacter being biased towards said first contacter when said first elongate member attains a second tension threshold value, said first contacter having an electrical signal generator for producing an electrical signal, said electrical signal generator being activated when said second contacter is biased thereagainst.

Typically, the connector sleeve includes a connector sleeve sidewall and a central column connected to an end sidewall and continuous therewith, said column having an axial column bore. The central column includes a stop end portion directed into said axial bore.

Typically, the first contacter includes a push button activatable by said second contacter when said second threshold tension value is attained. The push button is electrically connectable to an emitter when said second threshold tension value is attained. The emitter is connected to said inner end portion of said sleeve. The emitter includes an emitter casing surrounding said emitter, said emitter casing connected to said sleeve sidewall.

Typically, the second contacter includes a plunger having a plunger head for contacting said stop end portion of said column and a plunger shaft, said plunger shaft being sized to slide in said axial column bore.

Typically, a biasing means is connected to said plunger head and to said base sidewall.

Typically, a signal receiver is located in a cab of said vehicle. The signal receiver is calibrated to alert an operator to said second tension threshold.

Other objects and advantages of the present invention will become apparent from a careful reading of the detailed description provided herein, with appropriate reference to the accompanying drawings.

BRIEF DESCRIPTION OF THE FIGURES

Further aspects and advantages of the present invention will become better understood with reference to the description in association with the following Figures, wherein:

FIG. 3 is a cross section view of the tension alert device in a signal generating configuration under a second tension threshold value; and FIG. 4 is a cross section view of the tension alert device in a fully tensioned configuration under a first tension threshold value.

DETAILED DESCRIPTION OF THE PREFERRED EMBODIMENT

Figure 1:
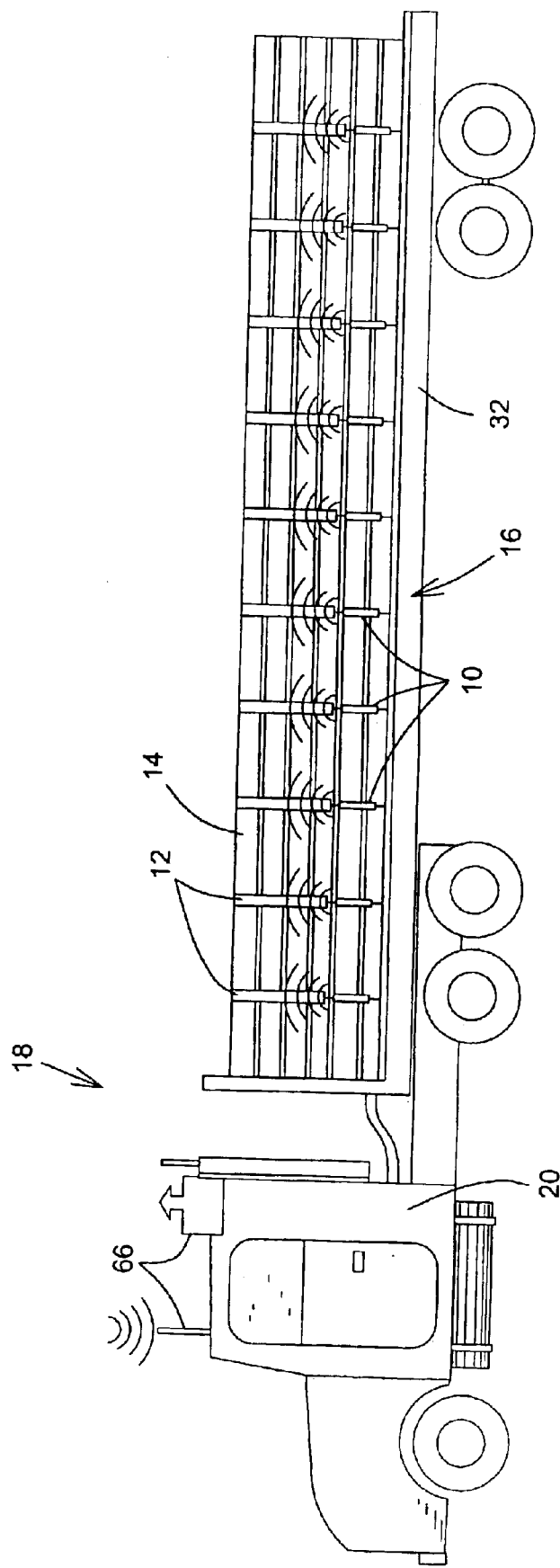
FIG. 1 is a simplified perspective view of a loaded vehicle including a number of tension alert devices.
Figure 2:
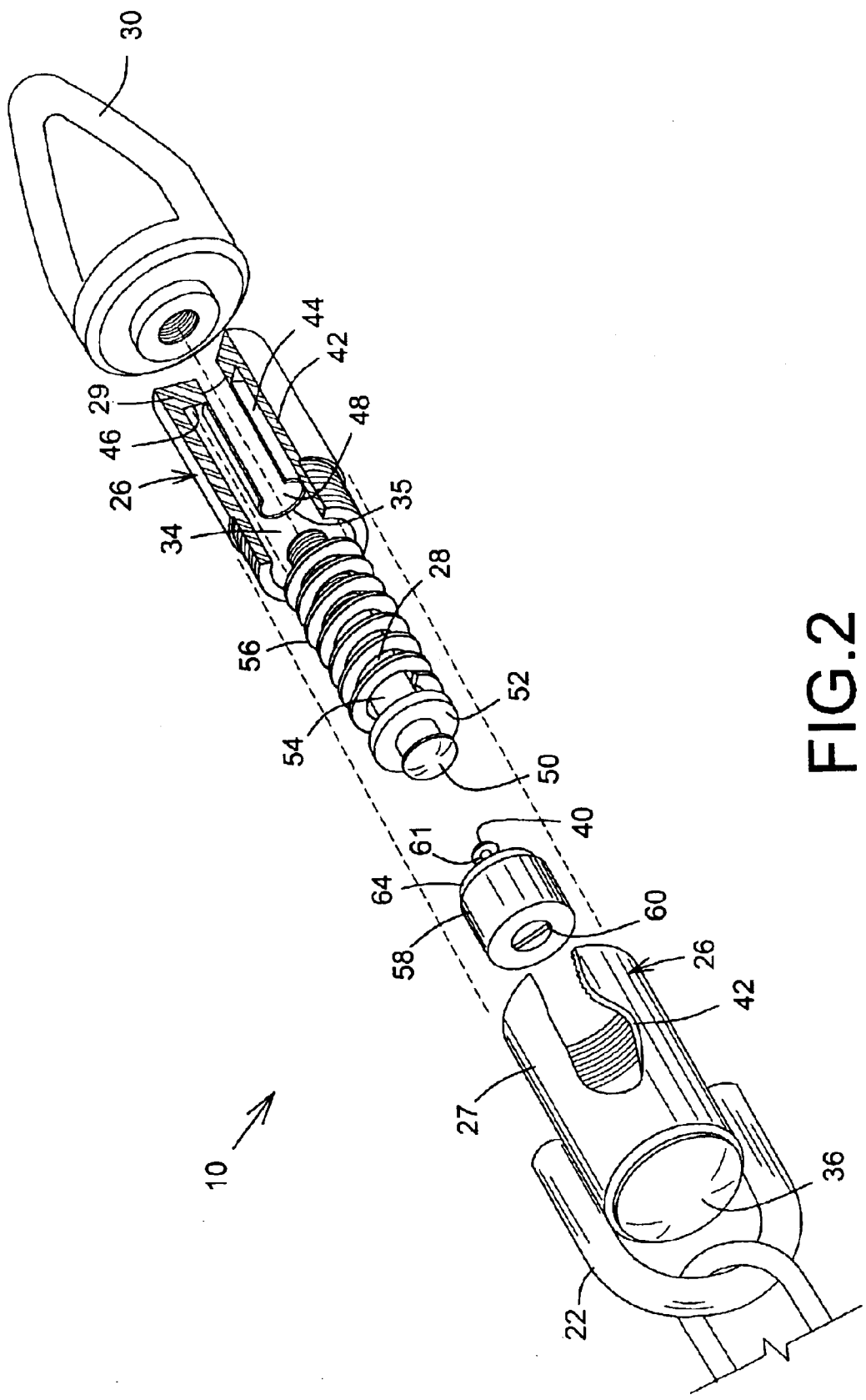
FIG. 2 is a perspective exploded view of a tension alert device in accordance with an embodiment of the present invention.

Referring to FIGS. 1 and 2, there is shown generally at 10 a tensioning alert device of the present invention connected to an elongated securing strap 12, belt or the like, lashed over a load 14 on a load bed 16 of a truck 18 having a cab 20. Broadly speaking the device 10 includes an attachment link piece 22, a first load bed connector hook 24, a connector sleeve 26, a plunger 28 and a second load bed connector 30, or strap connector.

The strap 12 is typically constructed of a resilient material which, when it is lashed over the load 14 and attached to the load bed 16 using the connector hook 24, the strap 12 has a first tension threshold value. The first hook 24 is typically connected to the side of a load bed frame 32. As is typical for most loads, many straps 12 are used for maximum securing efficiency and, as will be clear to one skilled in the art, corresponding numbers of tensioning alert devices 10 may be used with the straps 12.

Referring now to FIGS. 2, 3 and 4, the connector sleeve 26 includes an axial bore 34 and a sleeve end portion 36, which is connected to the first attachment link 22. Typically, the connector sleeve 26 includes first and second sleeve portions 27, 29, which are threaded to be screwed into each other to aid replacement of a conventional battery 60. The connector sleeve 26 includes an inner end portion 38 and a first contacter 40 connected thereto. The first contacter 40 is connected so that it faces into the axial bore 34. The second sleeve portion 29 has a connector sleeve sidewall 42 and a central column 44 connected to an end sidewall 46. The end sidewall 46 and the central column 44 are continuous with each other, the central-column 44 projecting into the axial bore 34. The central column 44 is typically positioned so that it is generally axially aligned with the first contacter 40. The central column 44 includes an axial column bore 48, which is sized to accommodate the plunger 28 and to allow the plunger 28 to slide along a path of travel in the axial column bore 48. The central column 44 includes a stop end portion 35 directed into the axial bore 34.

The plunger 28 includes a second contacter 50 connected to a plunger guide head 52, which is connected to the end of a plunger shaft 54. The plunger shaft 54 is connected to the second load bed connector 30, which is connected to the securing strap 12. The plunger guide head 52 both ensures an axial displacement of the plunger 28 relative to the second sleeve portion 29 by riadially fitting into the axial bore 34, and restricts the movement of the plunger along the path of travel by abuttingly engaging the stop end portion 35.

The second contacter 50 faces into the axial bore 34 and is generally axially aligned with the first contacter 40. When the securing strap 12 is at the first tension threshold value, the first tension value is sufficient to urge the plunger 28, and therefore the second contacter 50, away from the first contacter 40, as shown in FIG. 4. A plunger biasing tension spring 56 is connected to the underside of the plunger guide head 52 and to the end sidewall 46. When the first tension value in the securing strap 12 decreases to below a predetermined limit dictated by the plunger biasing spring 56, such as when the load 14 shifts on the load bed 16 or when one of the number of straps 12 breaks, the strap 12 attains a second threshold tension value. The second tension threshold value causes the plunger biasing spring 56 to bias the plunger 28 and therefore the second contacter 50 towards the first contacter 40 and generates an electrical signal, as described below.

A push button 61 is mounted in the connector sleeve 26 and is moveable when the second contacter 50 is biased against it at the second threshold tension value. The push button 61 includes an electrical signal generator 59 and a push button biasing spring 63. The signal generator 59 includes a first electrical connector 67 extending generally radially away from the push button 61 and a second electrical connector 69 extending generally radially towards the first electrical connector 67. As shown in FIG. 3, when the push button 61 is moved inwardly by the second contacter 50 against the action of the push button biasing spring 63, the two electrical connectors 67, 69 electrically connect and allow a signal emitter 58 to typically send an electromagnetic (radio frequency) signal. The signal emitter 58 is connected to the inner end portion 38 of the first sleeve portion 27 and to the electrical contacts 67, 69. The signal emitter 58 is electrically connected to and powered by the battery 60. The emitter 58 includes an emitter casing 62 which surrounds the emitter 58 and is in contact therewith and the sleeve sidewall 42.

An end plate 64 is connected to the emitter 58 and to the sleeve sidewall 42 and serves to center and axially align the first contacter 40 with the second contacter 50.

As seen in FIG. 1, a signal receiver 66 is located in the cab 20 of the vehicle 18 for wirelessly receiving any signal sent by any tensioning alert device 10. The signal receiver 66 is calibrated to alert an operator/driver to a signal that is emitted from the respective emitter 58 when its second threshold tension value is attained.

Although the present load tension alert device has been described with a certain degree of particularity it is to be understood that the disclosure has been made by way of example only and that the present invention is not limited to the features of the embodiments described and illustrated herein, but includes all variations and modifications within the scope and spirit of the invention as hereinafter claimed.

I claim:

1. Tension alert device for use with a load secured to a vehicle load bed, said device having a first elongate securing member having a first vehicle load bed connector and a first attachment link, said device comprising;

a connector sleeve having an axial bore and a sleeve end portion connected to said first attachment link;

a first contacter connected to an inner end portion of said connector sleeve and facing into said axial bore;

a second contacter mounted to slide in said axial bore along a restricted path of travel and having a second vehicle load bed connector connected to said vehicle load bed, said second contacter facing said first contacter and being urged away therefrom when said first elongate securing member has a first tension threshold value;

said second contacter being biased towards said first contacter when said first elongate member attains a second tension threshold value, said first contacter having an electrical signal generator for producing an electrical signal, said electrical signal generator being activated when said second contacter is biased thereagainst.

2. The device, according to claim 1, in which said connector sleeve includes a connector sleeve sidewall and a central column connected to an end sidewall and continuous therewith, said column having an axial column bore.

3. The device, according to claim 2, in which said central column includes a stop end portion directed into said axial bore.

4. The device, according to claim 3, in which said second contacter includes a plunger having a plunger head for contacting said stop end portion of said column and a plunger shaft, said plunger shaft being sized to slide in said axial column bore.

5. The device, according to claim 4, in which a biasing means is connected to said plunger head and to said base sidewall.

6. The device, according to claim 5, in which said biasing means is a tension spring.

7. The device, according to claim 1, in which said first contacter includes a push button activatable by said second contacter when said second threshold tension value is attained.

8. The device, according to claim 7, in which said push button is electrically connectable to an emitter when said second threshold tension value is attained.

9. The device, according to claim 8, in which said emitter is connected to said inner end portion of said sleeve.

10. The device, according to claim 9, in which said emitter includes an emitter casing surrounding said emitter, said emitter casing connected to said sleeve sidewall.

11. The device, according to claim 10, in which an end plate is connected to said emitter and to said sleeve sidewall so as to center said push button in said axial bore.

12. The device, according to claim 1, in which a signal receiver is located in a cab of said vehicle.

13. The device, according to claim 12, in which said signal receiver is calibrated to alert an operator to said second tension threshold.

14. The device, according to claim 12, in which said signal receiver is wirelessly connected to said device.

* * * * *